United States Patent
Ramet

[15] 3,646,871
[45] Mar. 7, 1972

[54] DIAPHRAGM ADJUSTMENT DEVICE FOR A MOTION PICTURE CAMERA

[72] Inventor: Gilbert Ramet, Cuarny, Switzerland

[73] Assignee: Paillard S.A., Sainte-Croix, Vaud, Switzerland

[22] Filed: Mar. 2, 1970

[21] Appl. No.: 15,621

[30] Foreign Application Priority Data

Mar. 13, 1969 Switzerland ..........................3794/69

[52] U.S. Cl. ...........................................95/64 B, 352/141
[51] Int. Cl. ...................................................G03b 9/07
[58] Field of Search.................................352/141; 95/64 B

[56] References Cited

UNITED STATES PATENTS

| | | | |
|---|---|---|---|
| 2,925,764 | 2/1960 | Sauer | 95/64 B |
| 3,048,090 | 8/1962 | Rentschler | 95/10 C |
| 3,432,229 | 3/1969 | Freudenschusz | 352/176 |
| 3,519,340 | 7/1970 | Vockenhuber | 352/72 |
| 2,996,965 | 8/1961 | La Rue | 352/141 X |
| 2,730,025 | 1/1956 | Faulhaber | 95/64 B X |
| 3,094,913 | 6/1963 | Morelle | 95/64 B X |
| 2,184,016 | 12/1939 | Mihalyi | 95/10 C X |

*Primary Examiner*—Samuel S. Matthews
*Assistant Examiner*—Monroe H. Hayes
*Attorney*—Emory L. Groff and Emory L. Groff, Jr.

[57] ABSTRACT

An automatic control and a manual regulator for the diaphragm are combined with preselection apparatus so that after manual focusing adjustment at maximum aperture, the latter is restored to automatic control on actuating the filming trigger. The automatic control comprises an electric motor actuating the diaphragm through a coupling and a friction clutch with a locking member. The coupling has two parts held in a certain position by a spring and two stops, and is rotatably mounted on a spring-urged sliding shaft fixed to a control button and bearing a cogwheel which meshes with a pinion for automatic control and disengages for manual control. Under or over exposure is indicated by lamps controlled by a contactor responsive to the direction of rotation of the motor.

5 Claims, 5 Drawing Figures

INVENTOR
GILBERT RAMET
BY
ATTORNEY

INVENTOR
GILBERT RAMET
BY Emory L. Groff Jr.
ATTORNEY

DIAPHRAGM ADJUSTMENT DEVICE FOR A MOTION PICTURE CAMERA

The present invention relates to a diaphragm adjustment device for a motion picture camera, or in a photographic apparatus.

Known diaphragm adjustment devices comprise automatic control means of the diaphragm and preselection means which enables, for example, the diaphragm to be set in its position of maximum opening, for example to enable finer adjustment of the focusing by observation of the image projected on a ground glass, the diaphragm brusquely resuming its preadjustment position as soon as the control of the camera is actuated.

Furthermore, it is known that in order to permit a more precise adjustment of the focus by observation of the image projected on a ground glass, it is advantageous to fully open the diaphragm of the objective forming this image, in order to obtain a minimum depth of field. To facilitate this adjustment of the focus, and, in the case of reflex cameras, to obtain at the same time the greatest possible luminosity in the viewfinder, there already are objectives with diaphragm preselection, that is to say in which a means is displaced to set the desired diaphragm opening for the picture to be taken, while the diaphragm can be fully opened during the sighting operation and quickly returned to the desired setting under the influence of a spring, at the moment the user presses the trigger to take the picture or start filming.

The combination of a preselection diaphragm with a fully automatic adjustment device piloted by a photoelectric means exposed to the light rays after their passage through the diaphragm, raises difficulties, because while the diaphragm is in its fully open position, the photoelectric means usually receives a light intensity much greater than normal, and hence tends to correct the diaphragm setting by closing the latter. The result is that, at the moment the picture is taken, the diaphragm first assumes a position that is closed down past the ideal position.

An object of the invention is to provide a diaphragm adjustment device, wherein a photoelectric element receives the light beam issuing from the objective lens, said element belonging to an electric circuit comprising a motor for controlling the adjustment of the diaphragm, and wherein the diaphragm position preselected by said motor is maintained while the diaphragm is put in its position of maximum opening, so that at the instant a view is taken the diaphragm is set to said preselected position disregarding the fact that the photoelectric element receives to much light during viewing at maximum opening.

A further object of the invention is to provide a fully automatic diaphragm setting device, and at the same time to make a preselection possible, all of this being arranged in such a way that at the time of preselection, the diaphragm will resume the position it occupied before being placed in fully opened position manually.

According to the invention, the device comprises coupling means, between the diaphragm and the motor, comprising two parts held in a definite relative position by elastic action and stop means, said adjustment device comprising locking means locking the coupling part driven by the motor, the other coupling part being connected by a coupling device with a manual adjustment member adapted to put the diaphragm in full opened position, and means for holding the diaphragm opened against said elastic action, said holding means being releasable to ensure fast return movement of the diaphragm to the position determined by the coupling part driven by the motor.

In order that the invention may be more fully understood, one embodiment of a diaphragm adjustment device according to the invention is described below, purely by way of illustrative but nonlimiting example, with reference to the accompanying diagrammatic drawing, in which.

Figure 1:
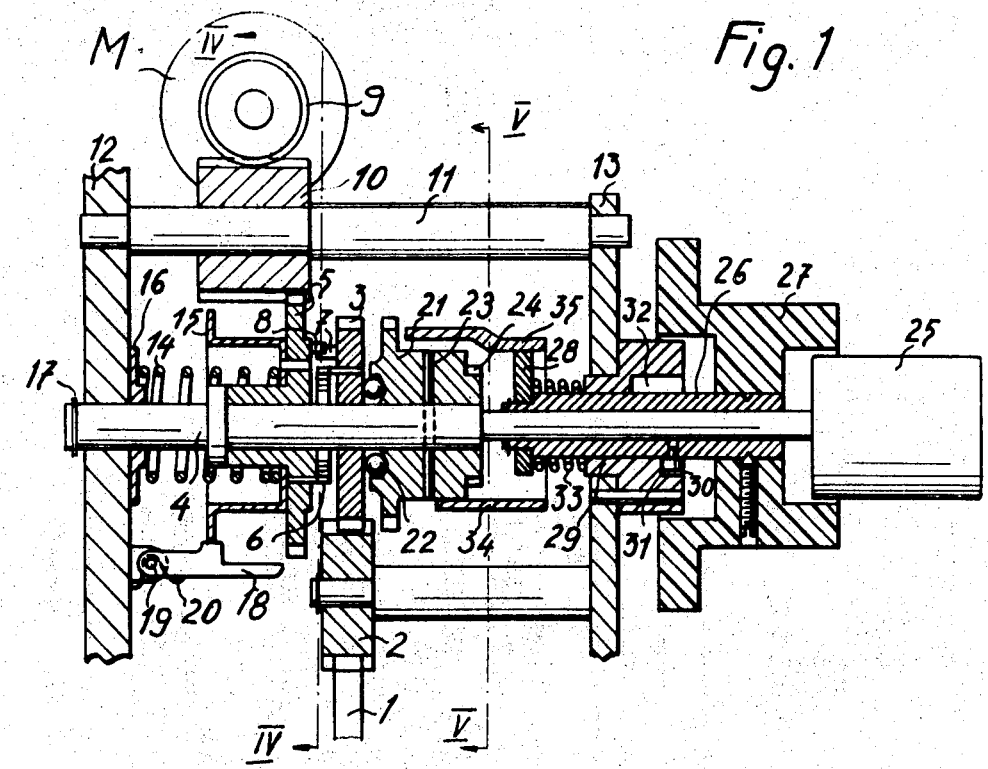
FIG. 1 is a view in section of said embodiment.

In FIG. 1, the mechanism of the diaphragm itself has not been shown, but only the control ring 1 of this diaphragm.

The periphery of this ring 1 is toothed and meshes with a toothed pinion 2, itself in engagement with a cogwheel 3 turning freely on a shaft 4. This cogwheel 3 constitutes a part of a coupling, whose other part is constituted by cogwheel 5, also rotating freely on the shaft 4. The wheels 3 and 5 are connected by a spiral spring 6 which holds them in a position such that two stops 7 and 8, rigidly fixed respectively to each of the said wheels, are in contact with one another. The wheels 3 and 5 are thus held in a definite angular relationship under the action of the spring 6.

In the position of automatic adjustment of the diaphragm, which is shown in FIG. 1, the displacements of the ring 1 are actuated by an electric motor M which drives, through a worm gear 9, a cogwheel 10 mounted on a shaft 11 and meshing with the cogwheel 5. The shaft 11 is mounted to pivot between two plates 12 and 13. The shaft 4 slides, at one of its ends, in a hole of the plate 12 and is urged towards the right by a spring 14, supported, on one hand, against a bell-shaped part 15, which is fixed to the wheel 5, and, on the other hand, against a washer 16 supported against the plate 12. The displacement of the shaft 4 to right is limited by an elastic washer 17 mounted in a groove at the end of this shaft and coming into abutment against the plate 12.

The bell-shaped part 15 acts through its periphery on a catch 18 hinged on a pivot 19 borne by the plate 12. This catch is subject to the action of a spring 20 and is intended to penetrate into the teeth of the wheel 5 to lock the latter in rotation when the device occupies one or other of the positions shown in FIGS. 2 and 3.

Shaft 4 also bears a cogwheel 21 of which the number of teeth is equal to that of the wheel 3. This cogwheel bears a ball thrust bearing 22 which retains the wheels 5 and 3 pushed by the spring 14. This wheel 21 is fixed in position on the shaft 4 by a cross-pin 23. It bears also a second denture 24 which constitutes a ratchet wheel rigidly fixed to the wheel 21.

The right end of the shaft 4 has a smaller diameter than its left portion and is terminated by a button 25. This right portion of the shaft 4 slides in a sleeve 26, bearing, on one hand, a knob 27 coaxial with the button 25, and, on the other hand, a cam 28. This sleeve 26 itself slides inside a bush 29 fixed to the plate 13 and having an annular groove portion 30 in which is displaced a pin 31 rigidly fixed to the sleeve 26. As is seen in FIG. 1, this groove 30 has a longitudinal channel 32 communicating with the groove 30, the use of which will be indicated below. A spring 33 is arranged between the cam 28 and the bush 29 and holds the pin 31 supported against the left side of the groove 30, thus fixing the axial position of the control knob 27.

The cam 28 enables action on two catches 34 and 35 intended to cooperate with the wheel 21.

Figure 5:
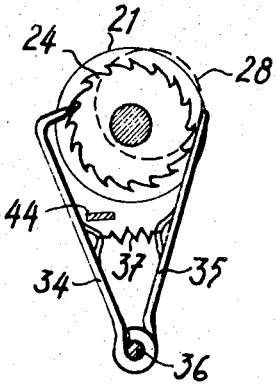
FIGS. 4 and 5 are partial sections along the lines IV—IV and V—V of FIG. 1.

As shown in FIG. 5, the two catches 34 and 35 are hinged on a pivot 36 and urged towards one another by a spring 37. In the position shown in FIG. 1, the catch 34 is supported against the smooth periphery of the wheel 21 and hence has no appreciable action on this wheel. The catch 35 is not in contact with the wheel 21, since it is held spaced from the latter by the cam 28.

When the device is in the position according to FIG. 1, the driving of the ring 1 is actuated by the motor M through the worm gear 9, cogwheels 10, 5 and 3, and pinion 2. The control button 25 has no action on the device in this position, and if it is caused to rotate, it causes the rotation of the wheel 21 which is not in engagement with any portion of the mechanism to the left of the wheel 21.

Figure 2:
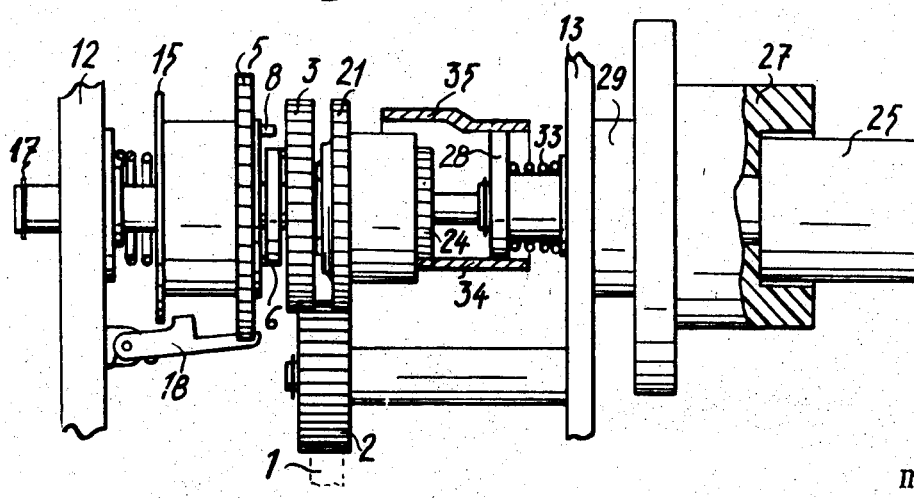
FIGS. 2 and 3 are similar views to that of FIG. 1, showing said embodiment in other operating positions.

When the user wishes to change to the preselection position, he pushes the button 25 axially, and hence the shaft 4, as indicated in FIG. 2. The wheel 21 and the cogwheels 3 and 5 are then moved towards the left under the opposing action of the spring 14. On this movement, the catch 34 is disengaged from the smooth periphery of the wheel 21 and is urged inwardly into contact with the ratchet teeth 24 of the wheel 21. At this moment, the end of this catch serves as axial stop for this wheel 21 as it abuts the shoulder of the rachet 24 and prevents the shaft 4 and the button 25 from resuming the position according to FIG. 1. On the displacement of the shaft 4, the teeth of the wheel 21 come into mesh on the pinion 2, which is still in engagement with the cogwheel 3. In this position, the user can open the diaphragm by making the button 25 turn which drives the pinion 2 through the cogwheel 21. On this rotation, the cogwheel 3 turns the same amount as the wheel 21, since these two wheels are in engagement with the pinion 2. The wheel 3 can turn with respect to the wheel 5 against the action of the spring 6, which separates the stops 7 and 8 from one another. In this position, the rotation of the cogwheel 5 is blocked by the catch 18 whose end penetrates between the teeth of the wheel 5.

When the user releases the button 25, the spring 6 cannot bring back the cogwheel 3 into position of contact of its stop 7 with the stop 8, since the catch 34 which fixes, on one hand, the axial position of the wheel 21, meshes with the ratchet teeth 24, and thus holds the wheel 21 in the position which has been communicated to it by the user.

As the photoelectric element (not shown) for the measurement of the light is in principle exposed to rays which are collected by the objective, the fact of opening the diaphragm manually increases the luminous flux striking the photoelectric element, so that the motor M is rotated in the direction actuating closure of the diaphragm.

Figure 4:
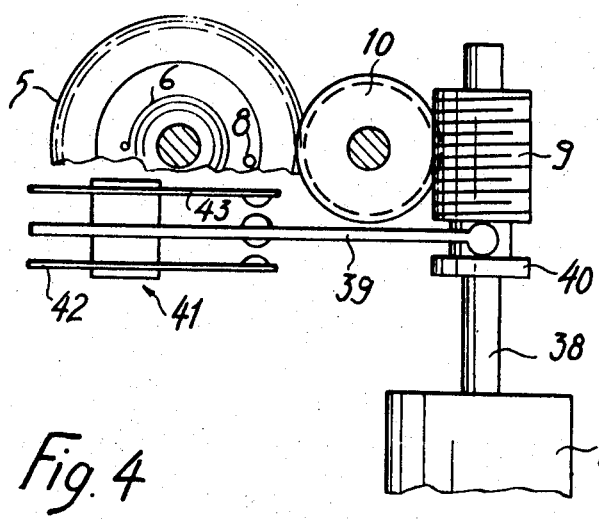

Since the rotation of the cogwheel 5, and hence of the cogwheel 10, is prevented by the catch 18, a friction coupling, not shown, is provided between the shaft 38 of the motor M (FIG. 4) and the worm gear 9. In this way, the motor can continue to rotate without involving excessive current consumption.

It should be noted that the axial position of the worm 9 on the shaft 38 of the motor M is fixed by an elastic blade 39 whose end is engaged in a groove 40 of the worm gear 9. This elastic blade 39 constitutes the middle contact of a contactor 41 comprising two lateral contacts 42 and 43 respectively. When the wheels 5 and 10 are locked in rotation, the axial reaction on the worm gear 9 becomes greater than the return force of the spring 39 and causes the closure between the contacts 39 and 42, or 39 and 43, according to the direction of rotation of the motor M. These contacts can hence be used to cause the illumination of one or other of two lamps indicating respectively that the momentary position of the diaphragm corresponds to an overexposure or to an underexposure.

When the device is in the position of FIG. 2 and the user actuates the shutter release of the camera, he causes displacement towards the left of a finger 44 (FIG. 5) which is connected mechanically to the shutter release. This finger pushes back the catch 34 against the action of the spring 37, so that this catch frees the ratchet teeth 24 and the wheel 21. The shaft 4 then resumes, under the action of the spring 14, the position illustrated in FIG. 1, whilst the spring 6 restores the wheel 3 into position of angular abutment with the wheel 5. The diaphragm thus takes up instantaneously the position which it occupied before the user had manually actuated a greater opening, for instance to facilitate focusing adjustment. In general, exposure conditions are not modified in the course of focusing adjustment, so that the diaphragm resumes exactly the position which is suitable for shooting.

However, if the lighting conditions have undergone change during the interval of time necessary for focusing, the automatic focusing adjustment device comes into operation from the moment of release and immediately reestablishes the adjustment of the diaphragm providing a correct exposure.

Figure 3:
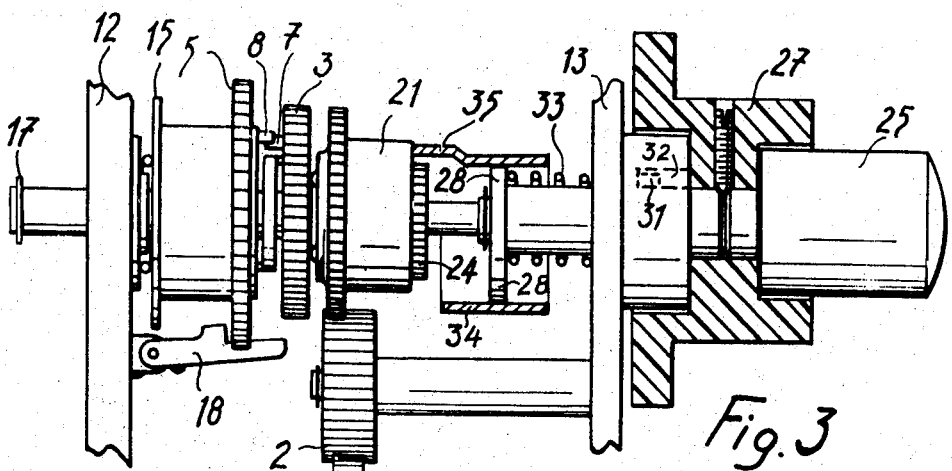

When the user wishes to effect manual adjustment of the diaphragm to obtain a special effect, he must bring the device into the position shown in FIG. 3. To this end, he first turns the knob 27 by a half-turn so that the pin 31 can penetrate into the channel 32. The rotation of the knob 27, and hence of the cam 28, frees the catch 35. This latter comes to hold the wheel 21 in the displaced axial position of FIG. 3 as soon as the shaft 4 and the button 25 have been pushed fully towards the left. This complete displacement towards the left is possible, since the knob 27 can also be displaced towards the left due to the presence of the groove 32. In this position, the cogwheel 3 is disengaged from pinion 2, and only the cogwheel 21 is in engagement with the latter. Any rotation impressed on the button 25 is hence transmitted to the diaphragm through the shaft 4, the wheel 21, the pinion 2 and the actuating ring 1. As in the case of the preselection illustrated in FIG. 2, the manual control position according to FIG. 3 is accompanied by locking of the cogwheel 5 by the catch 18. The motor M thus cannot make the cogwheels 5 and 10 rotate, which causes slipping of the friction coupling between the shaft 38 of the motor and the worm gear 9, and consequently the axial displacement of the worm gear 9 on the shaft as a function of the direction of rotation impressed on the motor. By the observation of lamps controlled by the contactor 41, the user can know immediately if the adjustment which he has selected corresponds to overexposure or underexposure.

I claim:

1. In a photographic apparatus having automatic setting means for a diaphragm control element comprising, a motor in circuit with photoelectric means, the improvement including, coupling means connecting said motor to said control element, said coupling means including first and second adjacent rotary parts having stop means, said first rotary part entrained by said motor, spring means urging said rotary parts to a given relative position as limited by said stop means, catch means selectively engageable with said motor entrained first rotary part to immobilize same, a third rotary part disposed adjacent said second rotary part and carried by a manually operable control member movable to adjust said diaphragm control element against the force of said spring means into full open position of said diaphragm, holding means engageable with said third rotary part to maintain the diaphragm in open position against the force of said spring means upon adjustment of said movably operable control member, and release means operable to disengage said holding means to allow said motor to return the diaphragm to the setting as determined by said first rotary part entrained by said motor.

2. A photographic apparatus according to claim 1 wherein, said release means acting on said holding means comprises an element combined with the shutter release of the apparatus.

3. A photographic apparatus according to claim 1, including, friction means connecting said motor to said first rotary part.

4. A photographic apparatus according to claim 1, including means indicating the direction of rotation of said motor.

5. A photographic apparatus according to claim 1 wherein, said third rotary part is axially movable by means of said manually operable control member whereby said first and second rotary parts are displaced to interrupt linking engagement between said motor and diaphragm control element to allow free manual adjustment of said diaphragm control element by subsequent rotary displacement of said control member and third rotary part.

* * * * *